(12) United States Patent
Okumura

(10) Patent No.: US 8,456,751 B2
(45) Date of Patent: Jun. 4, 2013

(54) OPTICAL SYSTEM HAVING FISHEYE ZOOM LENS AND OPTICAL APPARATUS HAVING THE OPTICAL SYSTEM

(75) Inventor: Tetsuichirou Okumura, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 126 days.

(21) Appl. No.: 13/180,705

(22) Filed: Jul. 12, 2011

(65) Prior Publication Data
US 2012/0013996 A1 Jan. 19, 2012

(30) Foreign Application Priority Data
Jul. 14, 2010 (JP) .................. 2010-159314

(51) Int. Cl.
*G02B 15/14* (2006.01)

(52) U.S. Cl.
USPC .......................................... 359/691; 359/682

(58) Field of Classification Search
CPC ....... G02B 15/14; G02B 15/161; G02B 15/177
USPC .................. 359/680–686, 689, 691
See application file for complete search history.

(56) References Cited

U.S. PATENT DOCUMENTS

| 5,877,901 A | 3/1999 | Enomoto et al. |
| 2004/0156119 A1 | 8/2004 | Shibayama |
| 2007/0047096 A1 | 3/2007 | Ito et al. |
| 2011/0164324 A1 | 7/2011 | Okumura |

FOREIGN PATENT DOCUMENTS

| JP | 2004-240023 A | 8/2004 |
| JP | 2007-094371 A | 4/2007 |
| JP | 2009271165 A | 11/2009 |

OTHER PUBLICATIONS

Extended European Search Report issued Oct. 18, 2011 for corresponding EP 11172786.3.

*Primary Examiner* — Darryl J Collins
(74) *Attorney, Agent, or Firm* — Rossi, Kimms, McDowell LLP

(57) ABSTRACT

An optical system includes, in order from an object side, a first lens unit having a negative refractive power and a second lens unit having a positive refractive power. The optical system satisfies: $1.70 \leq Yt/Yw \leq 2.5$, $Y=2 \times f \times \sin(\theta/2)$ ($85° \leq \theta \leq 90°$), and $3.45 \leq bfw/|f1| \leq 7$, where fw is the shortest focal length, ft is the longest focal length, f is an arbitrary focal length that satisfies $fw \leq f \leq ft$, θ is an angle between the optical axis and a principal ray of an off-axis light flux incident upon a lens surface closest to the object, Y is a formed image height of a ray incident at the angle θ, Yw is the largest image height at the shortest focal length, Yt is the largest image height at the longest focal length, f1 is a focal length of the first lens unit, and bfw is a back focus at the shortest focal length.

9 Claims, 11 Drawing Sheets

OPTICAL SYSTEM HAVING FISHEYE ZOOM LENS AND OPTICAL APPARATUS HAVING THE OPTICAL SYSTEM

BACKGROUND OF THE INVENTION

1. Field of the Invention

The present invention relates to an image pickup lens for use with a film-based camera, a digital still camera, and a digital video camera, and more particularly to a fisheye lens system and a fisheye zoom lens.

2. Description of the Related Art

A general fisheye lens is a single focus lens, such as a diagonal fisheye having an angle of field of about 180° in a diagonal direction of an image sensor and a circular fisheye having an angle of field of about 180° in all directions. Frequently used image sensors are a full-size image sensor (having a screen size of 36×24 mm and a diagonal length of 43.2 mm), an APS-H image sensor (having a screen size of 28.1× 18.7 mm and a diagonal length of 33.8 mm), an APS-C image sensor (having a screen size of 22.5×15.0 mm and a diagonal length of 27.0 mm). Zoom lenses having a diagonal fisheye lens range having an angle of field of about 180° are also proposed (Japanese Patent Laid-Open No. 2007-94371 and Japanese Patent No. 3646717).

Japanese Patent Laid-Open No. 2007-94371 discloses a zoom lens configured to provide a diagonal fisheye at the shortest focal length for the APS-C image sensor.

Japanese Patent No. 3646717 discloses a zoom lens configured to provide a diagonal fisheye in a camera having a plurality of screen sizes.

The angle of field of the fisheye lens has a finite value up to $\theta$ of about 180°, and its largest image height is proportional to the focal length. A fisheye lens that is commonly used for a lens exchange type camera having a variety of image sensor sizes cannot achieve a angle of field of 180° or can achieve the angle of field of 180° in only a few directions (such as diagonal directions) although it is called as a fisheye lens if the image sensor size used for the camera is small.

A term "zooming" in a fisheye lens means a change of an area in which the angle of field of 180° is achieved as the focal length f changes. Therefore, in zooming of a camera that uses a single image sensor, the fisheye zoom lens intends to form an image as an area that achieves an angle of field of 180° changes in the screen. When an image pickup area is within the angle of field of 180°, a cutout of an angle of field starts and a so-called telescopic phenomenon occurs. A circular fisheye refers to a state that achieves 180° in the entire circumferential angle of field, and a diagonal fisheye refers to a state that achieves an angle of field of 180° only in the screen's diagonal areas.

When cameras having image pickup elements having different sizes are used, the zoom ratio means an image pickup element range that can achieve an angle of field of 180°. It is thus highly likely that the camera having a smaller image pickup element can achieve the angle of field of 180°.

When the angle of field of 180° is achieved, a "wide angle end" and a "telephoto end" at a zoom position are useless, and this specification uses terms of the "shortest focal length side or shortest focal length" and the "longest focal length side or longest focal length".

In this situation, the above prior art disclosed in Japanese Patent Laid-Open No. 2007-94371 has a problem in that the circular fisheye is unavailable even with a full-size image sensor due to an insufficient small focal length on the shortest focal length side. In addition, the above prior art disclosed in Japanese Patent No. 3646717 has a problem in that a fisheye zoom lens is unavailable that satisfies a circular fisheye to a diagonal fisheye with a full-size image sensor because of an insufficient magnification varying ratio.

SUMMARY OF THE INVENTION

The present invention provides a fisheye zoom lens that can serve from a circular fisheye to a diagonal fisheye.

An optical system according to one aspect of the present invention includes, in order from an object side, a first lens unit having a negative refractive power and a second lens unit having a positive refractive power. The first lens unit and the second lens unit are moved along an optical axis when a magnification is varied from the shortest focal length to the longest focal length. The largest image height of the shortest focal length is different from that of the longest focal length. The optical system satisfies conditional expressions $1.70 \leq Yt/Yw \leq 2.5$, $Y = 2 \times f \times \sin(\theta/2)$ ($85° \leq \theta \leq 90°$), $3.45 \leq bfw/|f1| \leq 7$. "fw" is the shortest focal length, ft is the longest focal length. "f" is an arbitrary focal length that satisfies $fw \leq f \leq ft$. is an angle between the optical axis and a principal ray of an off-axis light flux incident upon a lens surface closest to the object. "Y" is a formed image height of a ray incident at the angle $\theta$. "Yw" is the largest image height at the shortest focal length. "Yt" is the largest image height at the longest focal length. "f1" is a focal length of the first lens unit. "bfw" is a back focus at the shortest focal length.

Further features of the present invention will become apparent from the following description of exemplary embodiments with reference to the attached drawings.

BRIEF DESCRIPTION OF THE DRAWINGS

FIG. 2A illustrates a variety of aberrations at the shortest focal length. FIG. 2B illustrates a variety of aberrations in an intermediate range. FIG. 2C illustrates a variety of aberrations at the longest focal length.

FIG. 4A illustrates a variety of aberrations at the shortest focal length. FIG. 4B illustrates a variety of aberrations in an intermediate range. FIG. 4C illustrates a variety of aberrations at the longest focal length.

FIG. 6A illustrates a variety of aberrations at the shortest focal length. FIG. 6B illustrates a variety of aberrations in an intermediate range. FIG. 6C illustrates a variety of aberrations at the longest focal length.

FIG. 7A is a circular fisheye for a full-size image sensor at the shortest focal length. FIG. 7B is a diagonal fisheye for an APS-C image sensor in the intermediate range. FIG. 7C is a diagonal fisheye for an APS-H image sensor in the intermediate range. FIG. 7D is a diagonal fisheye for the full-size image sensor at the longest focal length.

DESCRIPTION OF THE EMBODIMENTS

Figure 1:
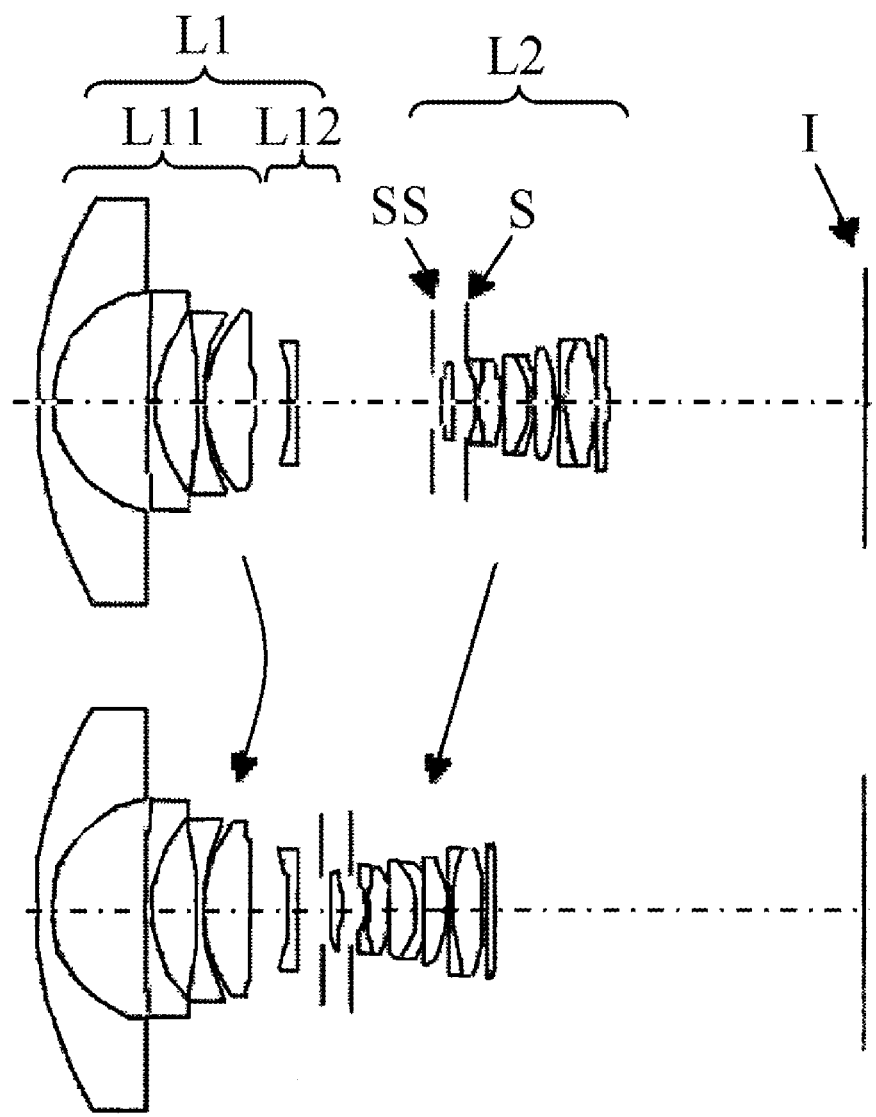
FIG. 1 is a lens structural view and a magnification varying locus at the shortest focal length and the longest focal length according to a first embodiment of the present invention.

A description will now be given of embodiments of the present invention with reference to the accompanying drawings. FIG. 1 is an optical diagram and a simplified movements diagram relating to the embodiment of the present invention. This fisheye zoom lens unit includes a first lens unit L1 having a negative (refractive) power and a second lens unit L2 having a positive (refractive) power, which can be divided by the largest air interval at the shortest focal length. In varying a magnification, the first lens unit L1 is once moved to the image plane side and then moved to the object side, and the second lens unit L2 is simultaneously moved to the object side so that an interval between the first lens unit L1 and the second lens unit L2 can monotonously decrease. Thereby, the magnification is varied to longest focal length. This operation provides different largest image heights between the shortest focal length state and the longest focal length state. This embodiment can provide a single-focus circular fisheye to a full screen size by fixing the above magnification varying operation at the shortest focal length. Similarly, a single-focus diagonal fisheye for each of the APS-C, APS-H, and full-size image sensor can be provided by fixing the magnification varying operation at an arbitrary position.

There are four types of projections using a fisheye lens: i) an equisolid angle projection represented by $Y=2f\sin(\theta/2)$, ii) an equidistance projection represented by $Y=f\theta$, iii) orthography represented by $Y=f\sin\theta$, and iv) a stereographic projection represented by $Y=2f\tan(\theta/2)$.

Figure 8:
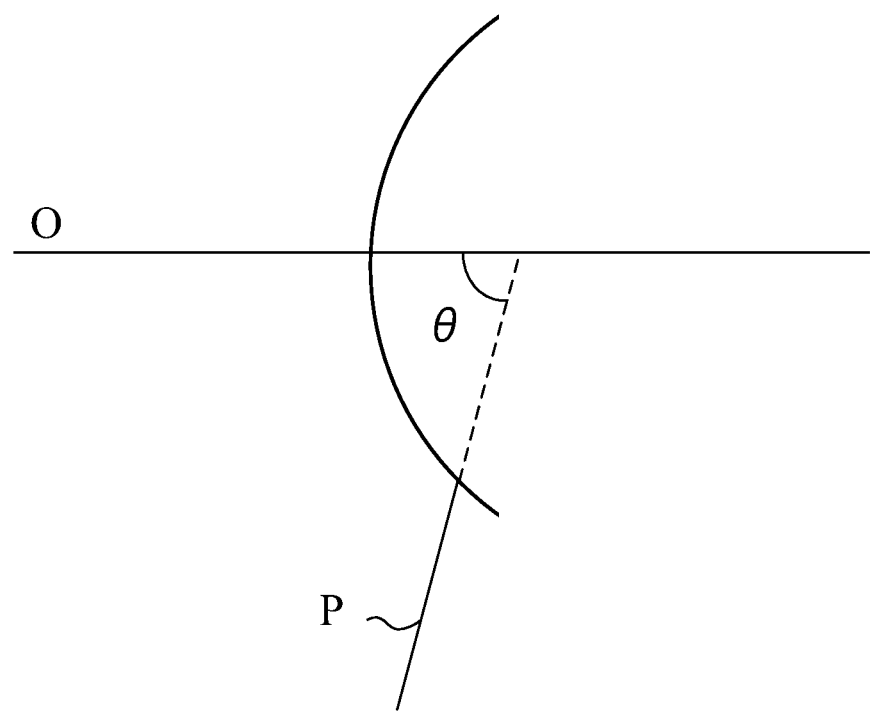
FIG. 8 is a view illustrating an angle θ between an optical axis of a lens closest to an object plane and a principal ray of an off-axis light flux.

Here, f is an arbitrary focal length that satisfies the shortest focal length fw≦f≦the longest focal length ft of the fisheye lens, θ is an angle between the optical axis and an principal ray of an off-axis light flux incident upon a lens surface closest to the object in the first lens unit L1 of the fisheye lens, and Y is a formed image height at the focal length f. As illustrated in FIG. 8, the angle θ is an angle between the optical axis O and an extension line formed when a principal ray P of the off-axis light flux incident upon the lens surface closest to the object goes straight in the lens.

According to this embodiment, the fisheye zoom lens satisfies the following conditional expressions:

The following conditional expression (1) defines the largest image height Yw at the shortest focal length and the largest image height Wt at the longest focal length in the fisheye zoom lens of this embodiment where $Y=2\times f\times\sin(\theta/2)$ (85°≦θ≦90°):

$$1.70 \leq Yt/Yw \leq 2.5 \tag{1}$$

When a value of Yt/Yw is higher than the upper limit of the conditional expression (1), changes of a variety of aberrations increase since a moving amount of each unit at the magnification varying time or the refractive power of each unit increases so as to maintain the magnification varying ratio. When the value of Yt/Yw is lower than the lower limit of the conditional expression (1), it becomes difficult to make a zoom lens that provides a circular fisheye to a diagonal fisheye.

Instead of the conditional expression (1), the following conditional expression (1A) may be satisfied where $Y=2\times f\times\sin(\theta/2)$ (85°≦θ≦90°):

$$1.80 \leq Yt/Yw \leq 2.2 \tag{1A}$$

Figure 7A:
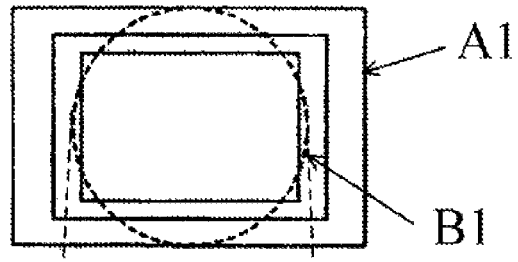
FIGS. 7A-7D are views illustrating a relationship between an image circle at the magnification varying time and a plurality of screen sizes.
Figure 7B:
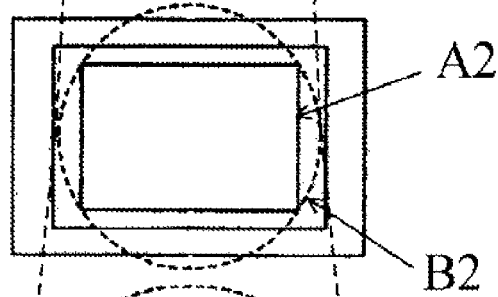
Figure 7C:
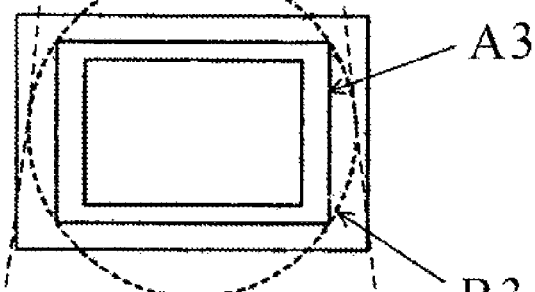
Figure 7D:
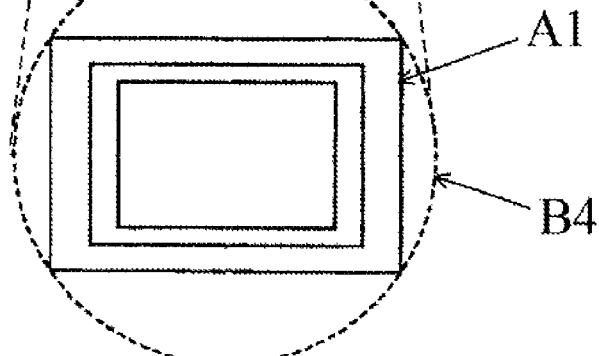

FIGS. 7A-7D are views illustrating a relationship between an image circle at the magnification varying time and a plurality of screen sizes as one illustrative embodiment. FIG. 7A is an image circle B1 (a state of a circular fisheye) for a screen size A1 corresponding to the full size at the shortest focal length. FIG. 7B is an image circle B2 (a state of a diagonal fisheye) for a screen size A2 corresponding to the APS-C size in an intermediate range. FIG. 7C is an image circle B3 (a state of a diagonal fisheye) for a screen size A3 corresponding to the APS-H size in an intermediate range. FIG. 7D is an image circle B4 (a state of a diagonal fisheye) for a screen size A1 corresponding to the full size at the longest focal length.

Thus, according to this embodiment, a circular fisheye can be achieved, for example, on the full-size screen at the shortest focal length. In addition, a diagonal fisheye can be achieved on the APS-C sized screen and the APS-H sized screen in the intermediate range. At the longest focal length, the diagonal fisheye can be achieved in the full-size screen. A ratio Yt/Yw between the largest image height Yw at the shortest focal length and the largest image height Yt at the longest focal length is 1.8 and satisfies the conditional expressions (1) and (1A).

This embodiment is not limited to the above structure configured to achieve the circular fisheye to the diagonal fisheye for the full-size screen. For example, the circular fisheye may be achieved for the APS-C sized screen at the shortest focal length. In this case, a circular fisheye for the APS-H sized screen and a circular fisheye in the full-size screen may be achieved in the intermediate range. In addition, a diagonal fisheye may be achieved for the APS-C sized screen at the longest focal length. A ratio Yt/Yw between the largest image height Yw at the shortest focal length and the largest image height Yt at the longest focal length is 1.8 and satisfies the conditional expressions (1) and (1A).

Moreover, for example, a circular fisheye may be achieved for the APS-H sized screen at the shortest focal length. In this case, a circular fisheye for the full-size screen and a diagonal fisheye for the APS-C sized screen may be achieved in the intermediate range. In addition, a diagonal fisheye may be achieved for the APS-H sized screen at the longest focal length. A ratio Yt/Yw between the largest image height Yw in the shortest focal length and the largest image height Yt at the longest focal length is 1.8 and satisfies the conditional expressions (1) and (1A).

Using the above structure, this embodiment can realize a zoom lens that provides not only a circular fisheye but also a diagonal fisheye in a single image sensor having a various sizes.

A general screen size often has an aspect ratio of 2:3. Therefore, the conditional expression (1) needs a value of 1.8 or higher so as to provide the circular fisheye to the diagonal fisheye to the screen size having this ratio.

The following conditional expression (2) defines a back focus bfw at the shortest focal length and a focal length f1 of the first lens unit:

$$3.45 \leq bfw/|f1| \leq 7 \tag{2}$$

When a value of bfw/|f1| exceeds the upper limit of the conditional expression (2), the first lens unit has an excessively small focal length and it becomes difficult to correct the curvature of field, lateral chromatic aberration, and distortion. When the value of bfw/|f1| exceeds the lower limit of the conditional expression (2), the first lens unit has an excessively long focal length and it becomes difficult to realize a circular fisheye at the shortest focal length or to secure a mechanical space since the back focus becomes short.

Instead of the conditional expression (2), the following conditional expression (2A) may be satisfied:

$$3.55 \leq bfw/|f1| \leq 5 \quad (2A)$$

The following conditional expression (3) defines a form of a negative meniscus lens closest to the object in the first lens unit:

$$0.4 \leq SF \leq 1.0 \quad (3)$$

Here, $SF1=(r1-r2)/(r1+r2)$ where $r1$ is a radius of curvature of the negative meniscus lens on the object side, $r2$ is a radius of curvature of the negative meniscus lens on the image side, and SF1 is a form factor.

When a value of SF1 exceeds the upper limit of the conditional expression (3), the lens is no longer a meniscus lens or cannot receive a ray having an angle of field of about 180°. When the value of SF1 exceeds the lower limit of the conditional expression (3), the refractive power of the lens becomes excessively weak, a distortion generating amount becomes excessively small, and it becomes difficult to achieve a fisheye lens having an angle of field of about 180°.

Instead of the conditional expression (3), the following conditional expression (3A) may be satisfied where $SF1=(r1-r2)/(r1+r2)$:

$$0.50 \leq SF1 \leq 0.75 \quad (3A)$$

The following conditional expression (4) defines a refractive index nG1 of a negative meniscus lens closest to the object in the first lens unit:

$$1.75 \leq nG1 \leq 2.0 \quad (4)$$

When a value of nG1 exceeds the upper limit of the conditional expression (4), the transmittance on the short wavelength side becomes excessively low and worsens the color balance. When the value of nG1 exceeds the lower limit of the conditional expression (4), the refractive power of the lens becomes excessively weak, a distortion generating amount becomes excessively small, and it becomes difficult to achieve a fisheye lens having an angle of field of about 180°.

Instead of the conditional expression (4), the following conditional expression (4A) may be satisfied:

$$1.80 \leq nG1 \leq 1.90 \quad (4A)$$

The following conditional expression (5) defines a partial dispersion ratio of one or more negative lenses closer to the image than the negative meniscus lens closest to the object side in the first lens unit:

$$\theta gF-(-0.001682 \cdot vd+0.6438) \geq 0.01 \quad (5)$$

Here, $\theta gF$ is a partial dispersion ratio and $vd$ is an Abbe number of the negative lens. Assume Ng, NF, Nd, and NC are refractive indexes of the negative lens with respect to the g-line (with a wavelength of 435.8 nm), F-line (with a wavelength of 486.1 nm), d-line (with a wavelength of 587.6 nm), and C-line (with a wavelength of 656.3 nm) of the Fraunhofer lines. In this case, the Abbe number vd and the partial dispersion ratio $\theta gF$ relating to the g-line and F-line become as follows:

$$vd=(Nd-1)/(NF-NC)$$

$$\theta gF=(Ng-NF)/(NF-NC)$$

When a value exceeds the lower limit of the conditional expression (5), it becomes difficult to correct the lateral chromatic aberration and thus the conditional expression (5) needs to be satisfied.

Instead of the conditional expression (5), the following conditional expression (5A) may be satisfied:

$$\theta gF-(-0.001682 \cdot vd+0.6438) \geq 0.018 \quad (5A)$$

The following conditional expression (6) defines a partial dispersion ratio of one or more positive lenses (convex lenses) in the second lens unit:

$$\theta gF-(-0.001682 \cdot vd+0.6438) \geq 0.01 \quad (6)$$

Here, $\theta gF$ is a partial dispersion ratio and $vd$ is an Abbe number of the positive lens. Assume Ng, NF, Nd, and NC are refractive indexes of the positive lens with respect to the g-line (with the wavelength of 435.8 nm), F-line (with the wavelength of 486.1 nm), d-line (with the wavelength of 587.6 nm), and C-line (with the wavelength of 656.3 nm) of the Fraunhofer lines. In this case, the Abbe number vd and the partial dispersion ratio $\theta gF$ relating to the g-line and F-line become as follows:

$$vd=(Nd-1)/(NF-NC)$$

$$\theta gF=(Ng-NF)/(NF-NC)$$

When a value exceeds the lower limit of the conditional expression (6), it becomes difficult to correct the longitudinal and lateral chromatic aberrations and thus the conditional expression (6) needs to be satisfied.

Instead of the conditional expression (6), the following conditional expression (6A) may be satisfied:

$$\theta gF-(-0.001682 \cdot vd+0.6438) \geq 0.018 \quad (6A)$$

The following conditional expression (7) defines a relationship between a moving amount m2 of the second lens unit at the magnification varying time and a focal length f2 in the second lens unit:

$$0.55 \leq m2/f2 \leq 0.8 \quad (7)$$

Here, m2 is a moving amount of the second lens unit to the object side in the magnification variation from the shortest focal length to the longest focal length.

When a value of m2/f2 exceeds the upper limit of the conditional expression (7), the moving amount becomes excessively large. Alternatively, the focal length of the second lens unit becomes excessively short and the aberrational change becomes excessive at the magnification variation time. When the value of m2/f2 exceeds the lower limit of the conditional expression (7), the moving amount becomes excessively small. Alternatively, the focal length of the second lens unit becomes excessively long and it becomes difficult to secure a desired magnification varying ratio:

Instead of the conditional expression (7), the following conditional expression (7A) may be satisfied:

$$0.60 \leq m2/f2 \leq 0.75 \quad (7A)$$

The following conditional expression (8) defines a ratio between the focal length of the first lens unit and the focal length of the second lens unit.

$$0.2 \leq |f1|/f2 \leq 0.42 \quad (8)$$

When a value of $|f1|/f2$ exceeds the upper limit of the conditional expression (8), the first lens unit has an excessively long focal length and it becomes difficult to realize a circular fisheye at the shortest focal length. When the value exceeds the lower limit of the conditional expression (8), the first lens unit has an excessively small focal length and it becomes difficult to correct a curvature of field and a lateral chromatic aberration.

Instead of the above conditional expression (8), the following conditional expression (8A) may be satisfied:

$$0.3 \leq |f1|/f2 \leq 0.42 \quad (8A)$$

This embodiment moves part (L12 of the first lens unit L1 at the focusing time. While most of the fisheye lens systems generally utilize an entire drawing system or a single-unit drawing system, the inner focus is suitable for quick autofocus. In addition, the fisheye lens often captures an object near the object, the inner focus that fixes the front lens is demanded so as to avoid pollution and flaws.

Next follows specific embodiments. A variety of aberrational diagrams illustrate the spherical aberration, the longitudinal chromatic aberration, the astigmatism, the curvature of field, the distortion, and the lateral chromatic aberration. "r" denotes a radius of curvature, "d" denotes a lens thickness or lens interval, "nd" denotes a refractive index for the d-line, "vd" denotes an Abbe number, and "BF" denotes a back focus value. An F-number, focal length, angle of field, BF, and a lens interval (d value) that changes as the magnification is varied are illustrated in order of the shortest focal length (W), intermediate focal length (M), and longest focal length (T).

An aspheric surface used for these embodiments is a curved surface obtained by rotating a curve around an optical axis which is provided by the following well-known aspheric expression (9) where the Z axis is set to the optical axis direction and the Y axis is set to a direction orthogonal to the optical axis:

$$Z = \frac{\frac{Y^2}{r}}{1 + \sqrt{1 - (1+K)\left(\frac{Y}{r}\right)^2}} + AY^2 + BY^4 + CY^6 + DY^8 + \quad (9)$$

The aspheric expression specifies a shape by providing a paraxial radius of curvature r, a cone constant K, high-order aspheric coefficients A, B, C, and D.

Various embodiments of the present invention will be described with reference to the accompanying drawings.

First Embodiment

Figure 2A:
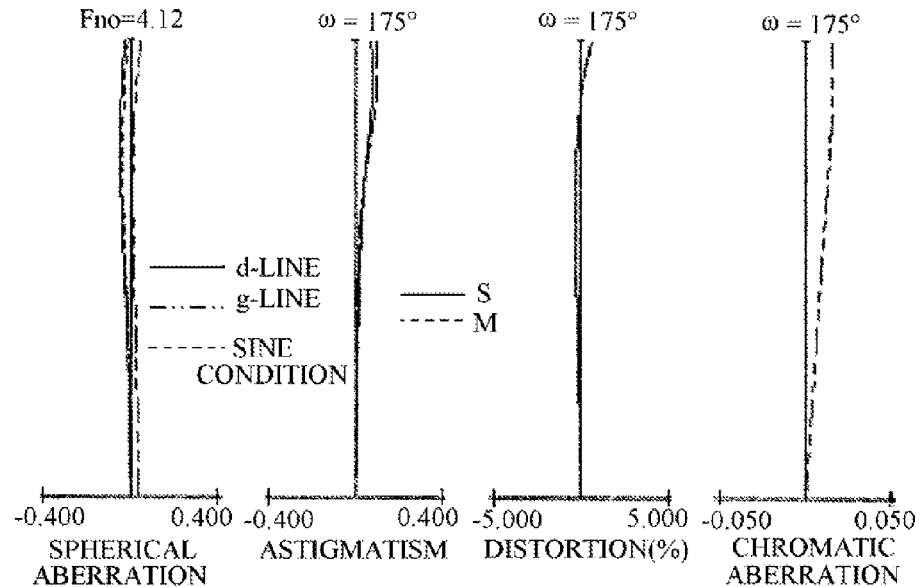
FIGS. 2A-2C illustrate a variety of aberrations in the structure illustrated in FIG. 1.
Figure 2B:
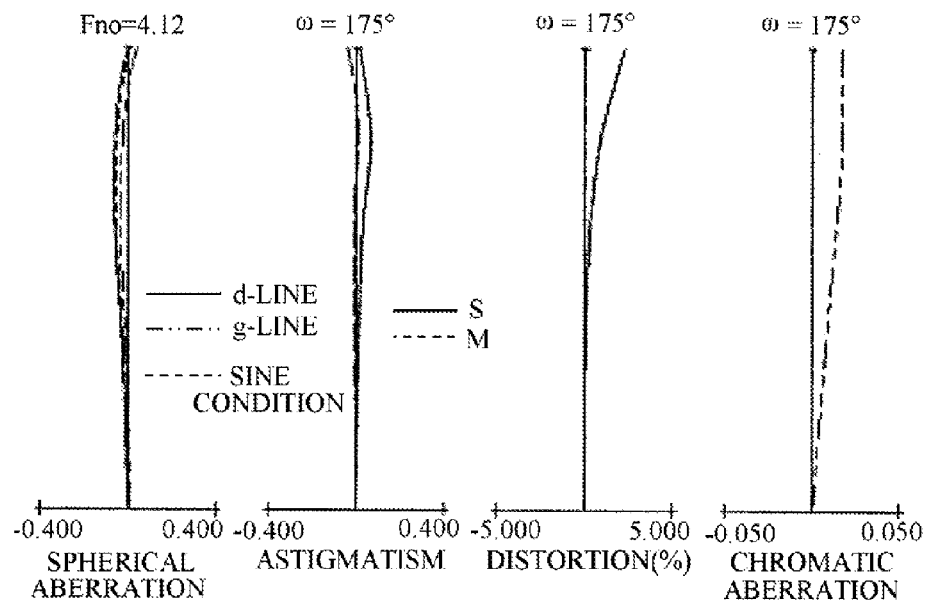
Figure 2C:
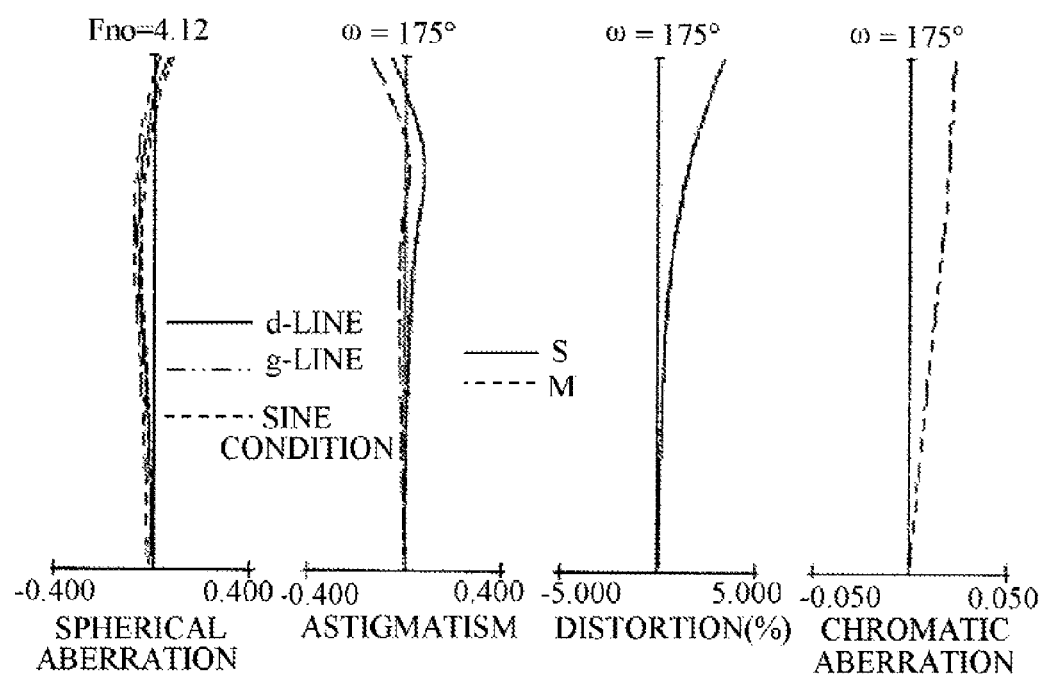

FIGS. 1 and 2A to C and Table 1 illustrate a fisheye zoom lens (optical system) according to a first embodiment of the present invention. FIG. 1 is the structural view of the fisheye zoom lens. FIG. 2A illustrates a variety of aberrations at the shortest focal length when an infinite end is focused, and illustrates the spherical aberration, astigmatism, distortion, and chromatic aberration. FIG. 2B illustrates a variety of aberrations in an intermediate range when an infinite end is focused, and illustrates the spherical aberration, astigmatism, distortion, and chromatic aberration. FIG. 2C illustrates a variety of aberrations at the longest focal length when an infinite end is focused, and illustrates the spherical aberration, astigmatism, distortion, and chromatic aberration. Table 1 summarizes the numerical value data.

The fisheye zoom lens system of this embodiment includes, in order from the object side, a first lens unit L1 having a negative refractive power, and a second lens unit L2 having a positive refractive power. The first lens unit includes, in order from the object side, an eleventh lens unit L11 having a negative refractive power, and a twelfth lens unit L12 having a negative refractive power. The eleventh lens unit includes, in order from the object side, a first negative meniscus lens that has a convex on the object side, a second negative meniscus lens that has a convex on the object side, a third negative lens, and a fourth positive lens. The twelfth lens unit includes a fifth negative lens. The second lens unit includes, in order from the object side, a supplemental stop (SS), a sixth positive lens, an aperture stop (S), a cemented lens of a seventh negative lens and an eighth positive lens, a cemented lens of a ninth positive lens and a tenth negative lens, a cemented lens of an eleventh positive lens, a twelfth negative lens, and a thirteenth positive lens, and a fourteenth positive lens. "I" denotes an image plane. This embodiment varies a magnification by changing an interval between the first lens unit and the second lens unit on the optical axis. Focusing is achieved by moving the twelfth lens unit in the first lens unit in the optical axis direction.

TABLE 1

UNIT mm

SURFACE DATA

| SURFACE NO | r | d | nd | vd | EFFECTIVE DIAMETER |
|---|---|---|---|---|---|
| 1 | 59.840 | 2.50 | 1.80400 | 46.6 | 61.87 |
| 2 | 17.282 | 14.64 | | | 34.15 |
| 3 | 129.723 | 1.61 | 1.59282 | 68.6 | 32.59 |
| 4 | 21.610 | 6.44 | | | 27.39 |
| 5 | −86.935 | 1.36 | 1.59282 | 68.6 | 27.10 |
| 6 | 31.102 | 0.15 | | | 25.84 |
| 7 | 22.525 | 7.45 | 1.80518 | 25.4 | 26.07 |
| 8 | −110.226 | 5.82 | | | 24.72 |
| 9* | −31.089 | 1.20 | 1.85135 | 40.1 | 17.80 |
| 10 | −844.340 | (VARIABLE) | | | 17.08 |
| 11 | ∞ | 1.46 | | | 10.26 |
| 12 | 43.413 | 1.62 | 1.88300 | 40.8 | 10.87 |
| 13 | −94.260 | 1.85 | | | 10.94 |
| 14(STOP) | ∞ | 1.70 | | | 10.95 |
| 15 | −19.292 | 0.75 | 1.88300 | 40.8 | 10.96 |
| 16 | 32.493 | 3.22 | 1.51823 | 58.9 | 11.53 |
| 17 | −20.261 | 0.20 | | | 12.31 |
| 18 | 194.716 | 4.25 | 1.48749 | 70.2 | 12.74 |
| 19 | −12.377 | 0.80 | 1.88300 | 40.8 | 13.21 |
| 20 | −27.182 | 0.20 | | | 13.96 |
| 21 | 712.893 | 3.28 | 1.59270 | 35.3 | 14.77 |
| 22 | −21.620 | 0.35 | | | 15.87 |
| 23 | −60941.798 | 0.93 | 1.83400 | 37.2 | 16.91 |
| 24 | 28.231 | 4.77 | 1.49700 | 81.5 | 17.60 |
| 25 | −34.279 | 0.20 | | | 18.70 |
| 26 | −80910.795 | 1.68 | 1.48749 | 70.2 | 19.49 |
| 27 | −87.072 | (VARIABLE) | | | 19.87 |
| IMAGE PLANE | ∞ | | | | |

ASPHERIC DATA
NINTH SURFACE

| K = 0.00000e+000 | A4 = −6.64162e−006 |
| A6 = 2.58871e−008 | A8 = −8.99837e−010 |
| A10 = 1.12233e−011 | A12 = −5.07106e−014 |

VARIOUS DATA

| | SHORT FOCUS | INTERMEDIATE | LONG FOCUS |
|---|---|---|---|
| FOCAL LENGTH | 8.05 | 11.85 | 15.14 |
| F NUMBER | 4.12 | 4.12 | 4.12 |
| IMAGE ANGLE | 175 | 175 | 175 |
| IMAGE HEIGHT | 11.15 | 16.77 | 21.64 |
| LENS OVERALL LENGTH | 129.57 | 127.26 | 129.98 |
| BF | 40.25 | 49.58 | 57.66 |
| d10 | 20.89 | 9.25 | 3.89 |
| d27 | 40.25 | 49.58 | 57.66 |

ZOOM LENS UNIT DATA

| UNIT | STARTING SURFACE | FOCAL LENGTH | LENS LENGTH | FRONT FOCAL POINT POSITION | BACK FOCAL POINT POSITION |
|---|---|---|---|---|---|
| 1 | 1 | −10.91 | 41.17 | 10.51 | −15.41 |
| 2 | 11 | 26.80 | 27.26 | 15.90 | −6.32 |

Second Embodiment

Figure 3:
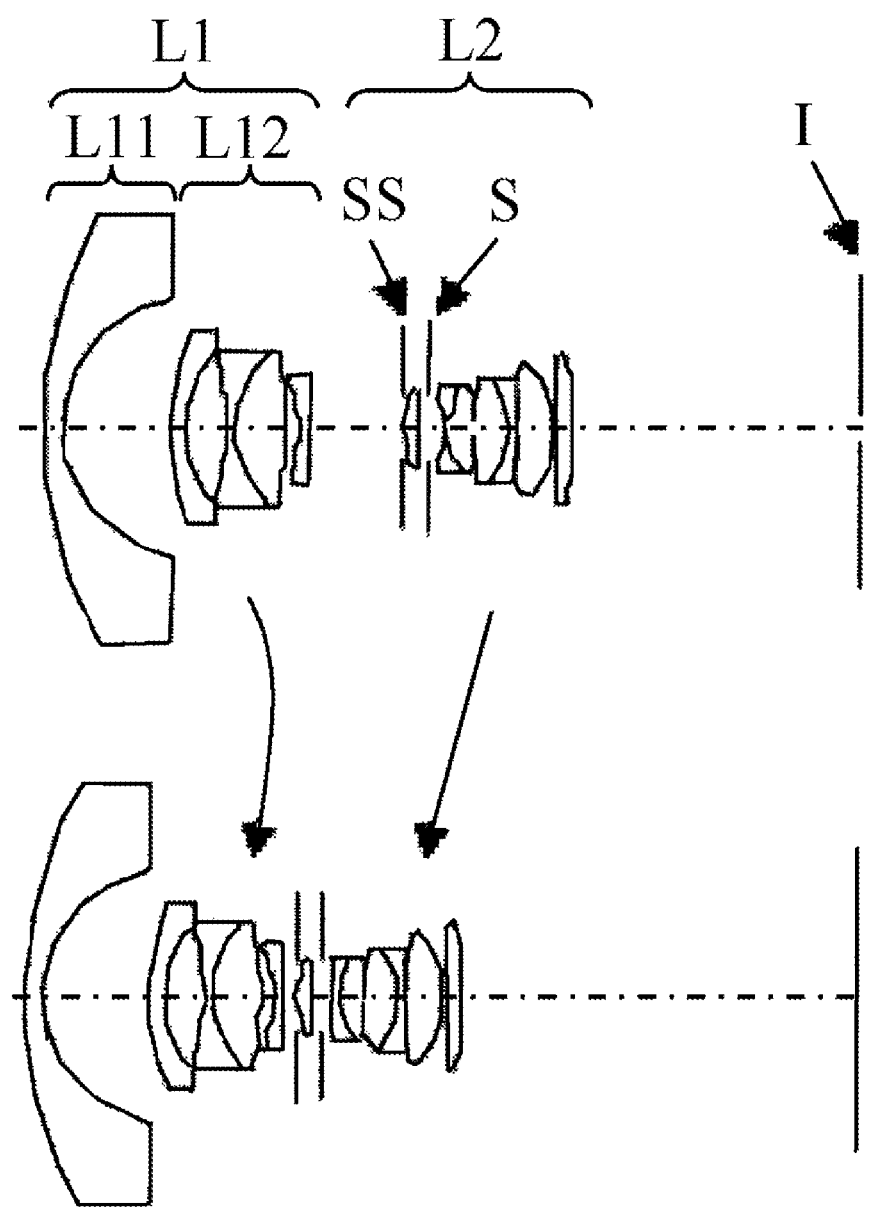
FIG. 3 is a lens structural view and a magnification varying locus at the shortest focal length and the longest focal length according to a second embodiment of the present invention.
Figure 4A:
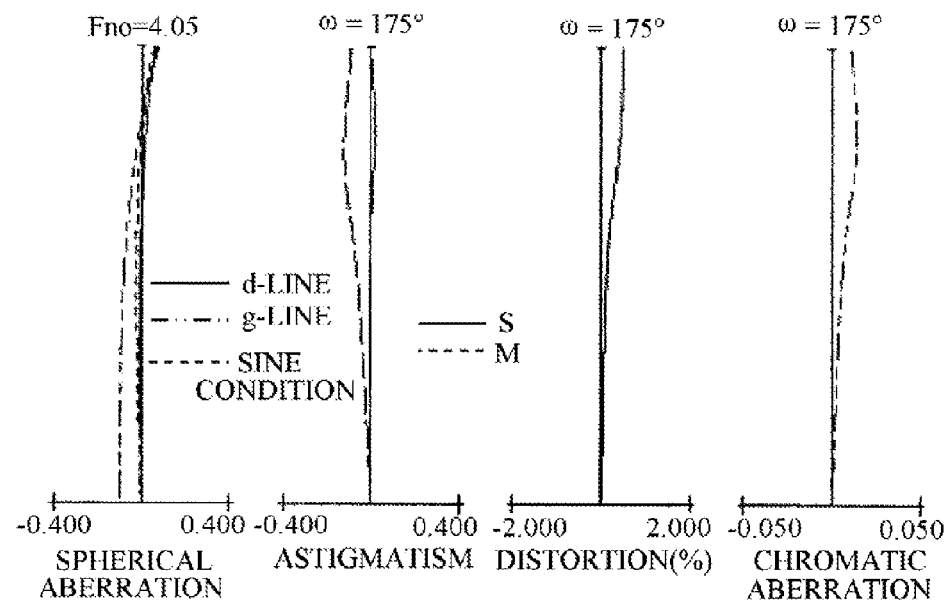
FIGS. 4A-4C illustrate a variety of aberrations in the structure illustrated in FIG. 3.
Figure 4B:
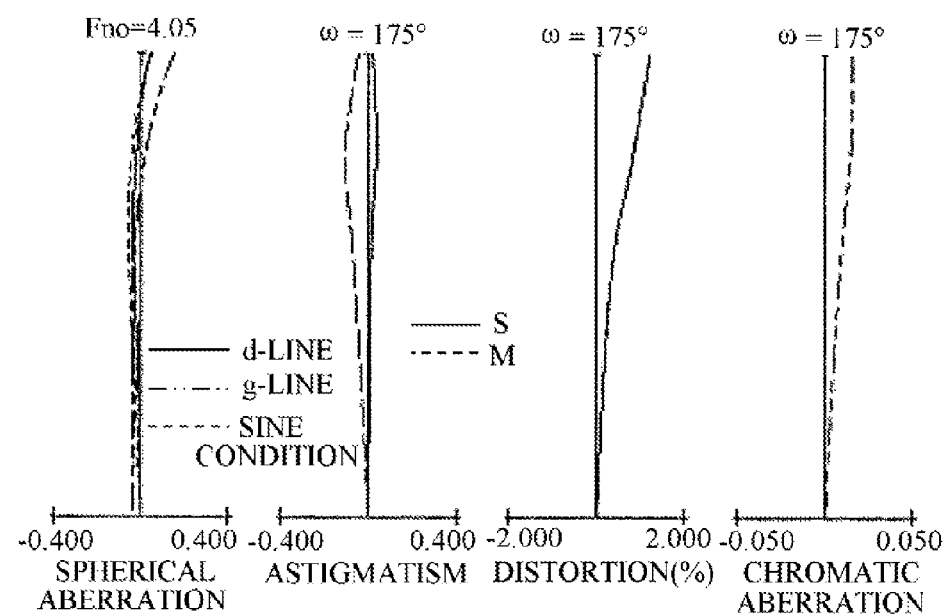
Figure 4C:
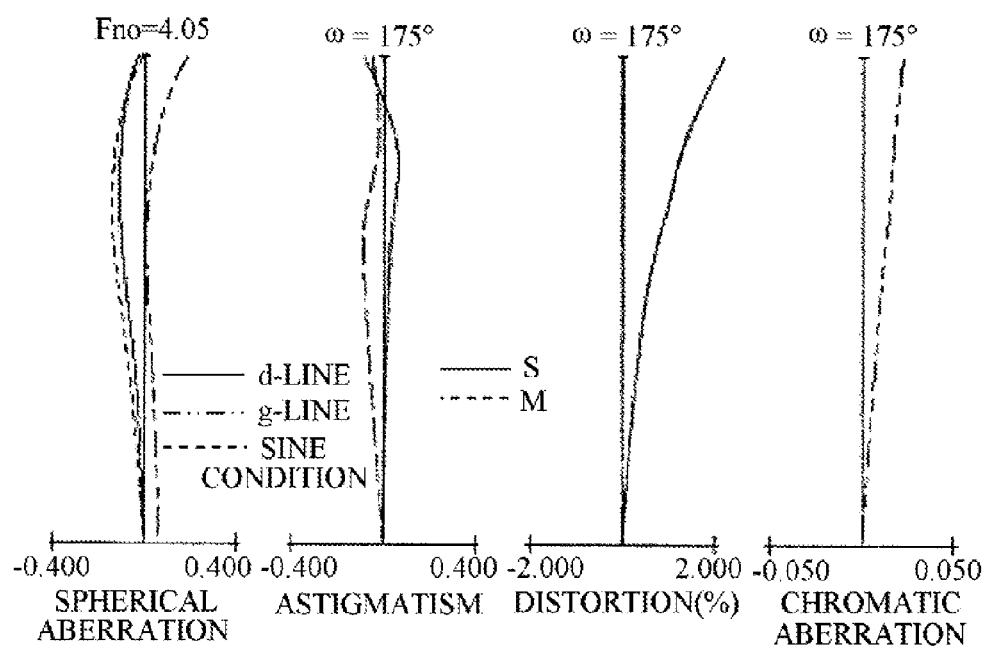

FIGS. 3 and 4A to C and Table 2 illustrate a fisheye zoom lens according to a second embodiment of the present invention. FIG. 3 is the structural view of the fisheye zoom lens. FIG. 4A illustrates a variety of aberrations at the shortest focal length when an infinite end is focused, and illustrates the spherical aberration, astigmatism, distortion, and chromatic aberration. FIG. 4B illustrates a variety of aberrations in an intermediate range when an infinite end is focused, and illustrates the spherical aberration, astigmatism, distortion, and chromatic aberration. FIG. 4C illustrates a variety of aberrations at the longest focal length when an infinite end is focused, and illustrates the spherical aberration, astigmatism, distortion, and chromatic aberration. Table 2 summarizes the numerical value data.

The fisheye zoom lens system of this embodiment includes, in order from the object side, a first lens unit L1 having a negative refractive power and a second lens unit L2 having a positive refractive power. The first lens unit includes, in order from the object side, an eleventh lens unit L11 having a negative refractive power, and a twelfth lens unit L12 having a negative refractive power. The eleventh lens unit includes a first negative meniscus lens that has a convex on the object side. The twelfth lens unit includes, in order from the object side, a second negative meniscus lens that has a convex on the object side, a third negative lens, a fourth positive lens, and a fifth negative lens. The second lens unit includes, in order from the object side, a supplemental stop (SS), a sixth positive lens, an aperture stop (S), a cemented lens of a seventh negative lens and an eighth positive lens, a cemented lens of a ninth positive lens and a tenth negative lens, an eleventh positive lens, and a twelfth positive lens. "I" denotes an image plane. This embodiment varies a magnification by changing an interval between the first lens unit and the second lens unit on the optical axis. Focusing is achieved by moving the twelfth lens unit in the first lens unit in the optical axis direction.

TABLE 2

UNIT mm

SURFACE DATA

| SURFACE NO | r | d | nd | vd | EFFECTIVE DIAMETER |
|---|---|---|---|---|---|
| 1 | 62.000 | 2.60 | 1.80400 | 46.6 | 58.33 |
| 2 | 18.100 | 15.41 | | | 34.44 |
| 3 | 38.618 | 1.80 | 1.80400 | 46.6 | 25.02 |
| 4 | 14.968 | 5.55 | | | 20.35 |
| 5 | −38.773 | 1.36 | 1.49700 | 81.5 | 20.15 |
| 6 | 13.721 | 7.00 | 1.80610 | 33.3 | 18.10 |
| 7 | −41.538 | 1.68 | | | 16.58 |
| 8 | −21.935 | 1.32 | 1.88300 | 40.8 | 13.99 |
| 9 | 1151.046 | (VARIABLE) | | | 13.17 |
| 10 | ∞ | 0.30 | | | 9.50 |
| 11 | 20.995 | 2.00 | 1.67270 | 32.1 | 9.85 |
| 12 | −147.709 | 1.00 | | | 9.90 |
| 13(STOP) | ∞ | 2.00 | | | 9.91 |
| 14 | −32.712 | 0.93 | 1.88300 | 40.8 | 9.93 |
| 15 | 12.947 | 3.12 | 1.59270 | 35.3 | 10.29 |
| 16 | −71.723 | 0.28 | | | 10.94 |
| 17 | 31.397 | 4.60 | 1.48749 | 70.2 | 11.42 |
| 18 | −10.807 | 1.18 | 1.80610 | 33.3 | 11.84 |
| 19 | −120.666 | 0.22 | | | 13.82 |
| 20 | 103.273 | 5.01 | 1.49700 | 81.5 | 15.08 |
| 21 | −14.923 | 0.33 | | | 17.00 |
| 22* | 86.516 | 2.46 | 1.58313 | 59.4 | 19.39 |
| 23 | −49.317 | (VARIABLE) | | | 19.84 |
| IMAGE PLANE | ∞ | | | | |

ASPHERIC DATA
TWENTY-SECOND SURFACE

K = 0.00000e+000　　A4 = −1.79213e−005
A6 = −2.20392e−008　　A8 = 4.39447e−012
A10 = −4.83129e−013

VARIOUS DATA

| | SHORT FOCUS | INTERMEDIATE | LONG FOCUS |
|---|---|---|---|
| FOCAL LENGTH | 8.60 | 11.44 | 15.01 |
| F NUMBER | 4.05 | 4.05 | 4.05 |
| IMAGE ANGLE | 175 | 175 | 175 |
| IMAGE HEIGHT | 12.00 | 15.98 | 21.64 |
| LENS OVERALL LENGTH | 113.33 | 114.11 | 118.57 |
| BF | 39.99 | 47.23 | 56.34 |
| d9 | 13.19 | 6.74 | 2.09 |
| d23 | 39.99 | 47.23 | 56.34 |

ZOOM LENS UNIT DATA

| UNIT | STARTING SURFACE | FOCAL LENGTH | LENS LENGTH | FRONT FOCAL POINT POSITION | BACK FOCAL POINT POSITION |
|---|---|---|---|---|---|
| 1 | 1 | −9.36 | 36.71 | 11.07 | −12.23 |
| 2 | 10 | 23.88 | 23.43 | 15.10 | −5.82 |

Third Embodiment

Figure 5:
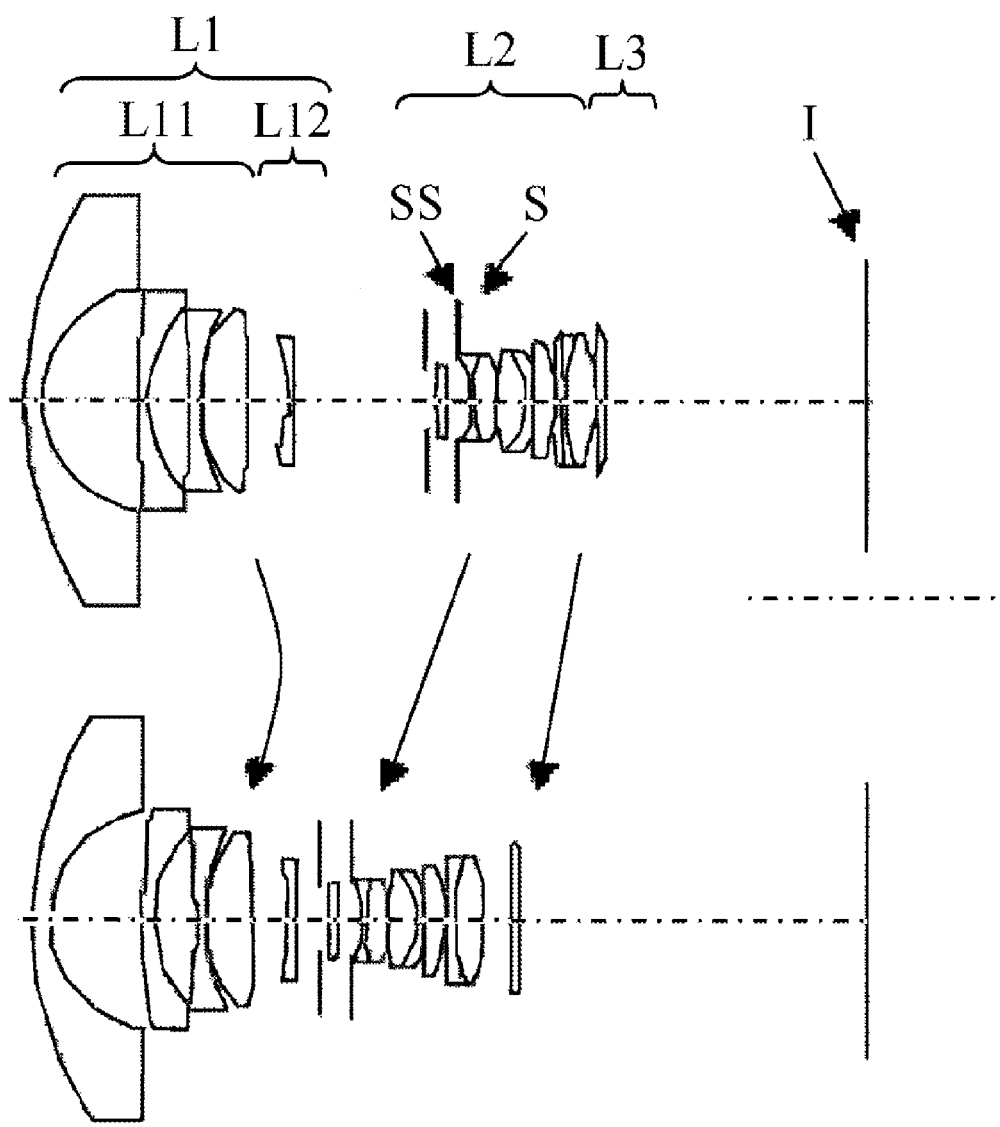
FIG. 5 is a lens structural view and a magnification varying locus at the shortest focal length and the longest focal length according to a third embodiment of the present invention.
Figure 6A:
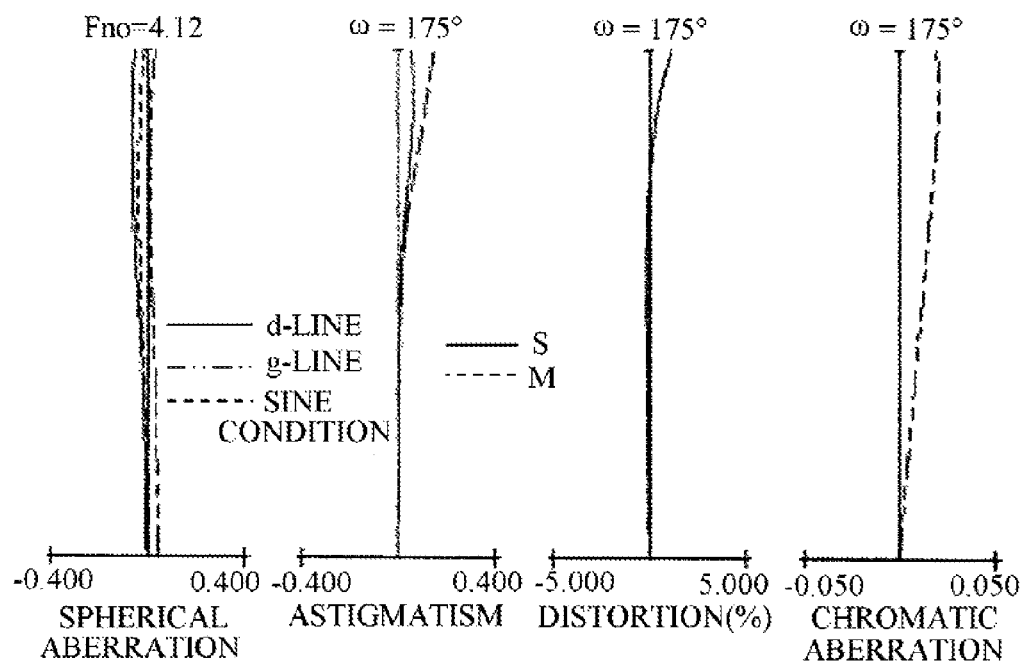
FIGS. 6A-6C illustrate a variety of aberrations in the structure illustrated in FIG. 5.
Figure 6B:
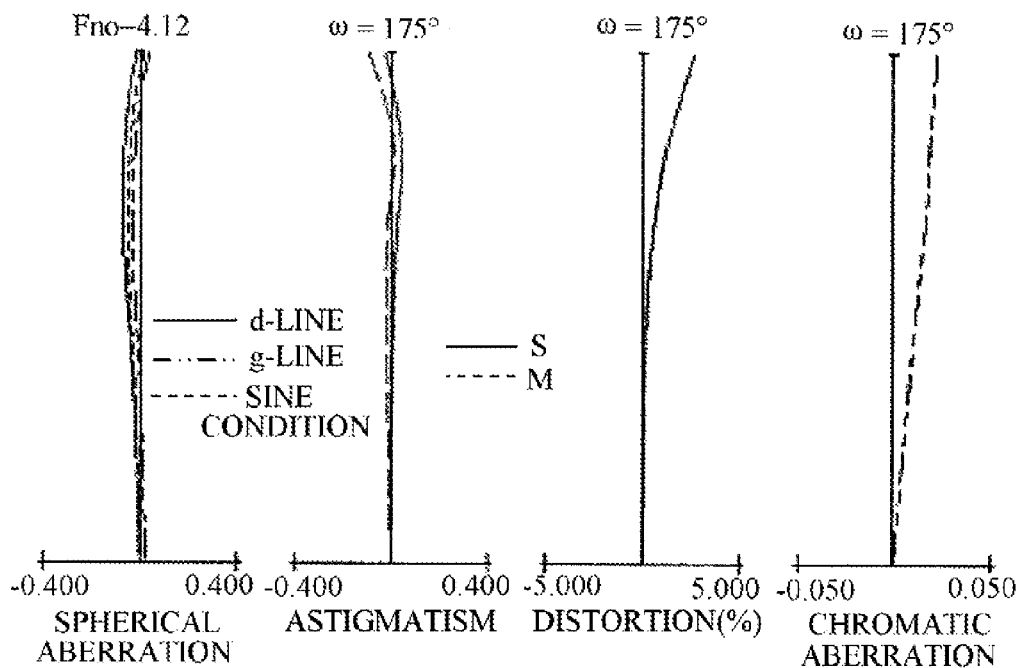
Figure 6C:
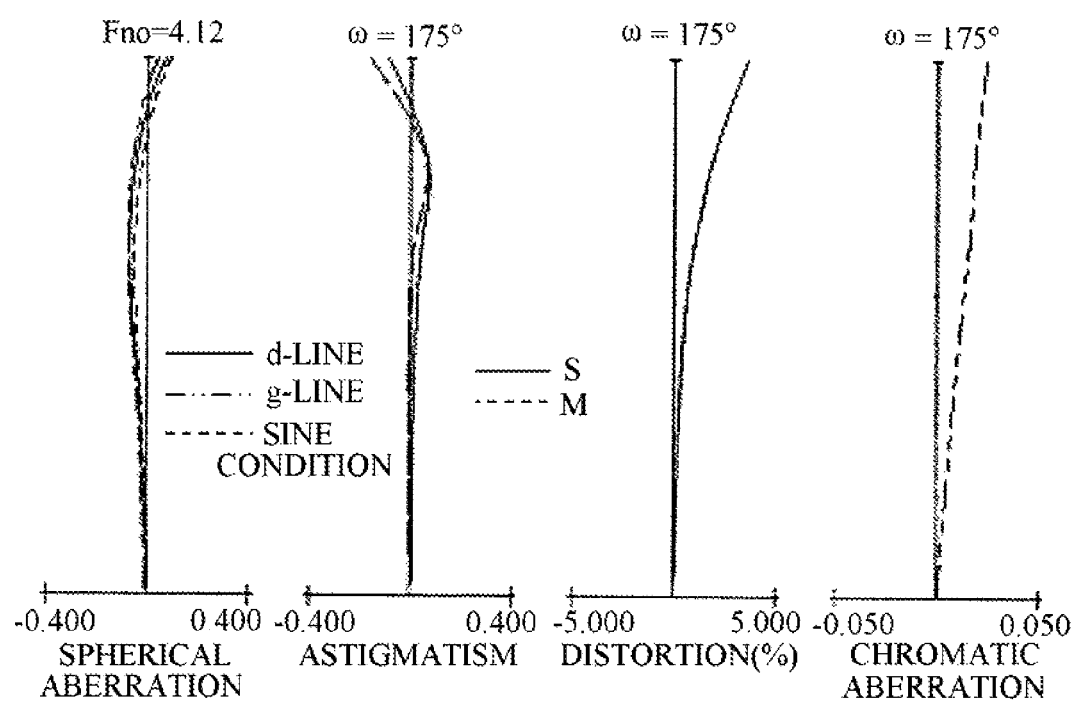

FIGS. 5 and 6A to C and Table 3 illustrate a fisheye zoom lens according to a third embodiment of the present invention. FIG. 5 is the structural view of the fisheye zoom lens. FIG. 6A illustrates a variety of aberrations at the shortest focal length when an infinite end is focused, and illustrates the spherical aberration, astigmatism, distortion, and chromatic aberration. FIG. 6B illustrates a variety of aberrations in an intermediate range when an infinite end is focused, and illustrates the spherical aberration, astigmatism, distortion, and chromatic aberration. FIG. 6C illustrates a variety of aberrations at the longest focal length when an infinite end is focused, and illustrates the spherical aberration, astigmatism, distortion, and chromatic aberration. Table 3 summarizes the numerical value data.

The fisheye zoom lens system of this embodiment includes, in order from the object side, a first lens unit L1 having a negative refractive power, a second lens unit L2 having a positive refractive power, and a third lens unit L3 having a positive refractive power. The first lens unit includes, in order from the object side, an eleventh lens unit L11 having a negative refractive power, and a twelfth lens unit L12 having a negative refractive power. The eleventh lens unit includes, in order from the object side, a first negative meniscus lens that has a convex on the object side, a second negative meniscus lens that has a convex on the object side, a third negative lens, and a fourth positive lens. The twelfth lens unit includes a fifth negative lens. The second lens unit includes, in order from the object side, a supplemental stop (SS), a sixth positive lens, an aperture stop (S), a cemented lens of a seventh negative lens and an eighth positive lens, a cemented lens of a ninth positive lens and a tenth negative lens, and a cemented lens of an eleventh positive lens, a twelfth negative lens, a thirteenth positive lens. The third lens unit includes a fourteenth positive lens. "I" denotes an image plane. This embodiment varies a magnification by changing intervals among the first lens unit, the second lens unit, and the third lens unit on the optical axis. Focusing is achieved by moving the twelfth lens unit in the first lens unit in the optical axis direction.

TABLE 3

UNIT mm

SURFACE DATA

| SURFACE NO | r | d | nd | vd | EFFECTIVE DIAMETER |
|---|---|---|---|---|---|
| 1 | 60.000 | 2.50 | 1.80400 | 46.6 | 61.58 |
| 2 | 17.284 | 14.71 | | | 34.10 |
| 3 | 147.251 | 1.61 | 1.59282 | 68.6 | 32.39 |
| 4 | 21.509 | 6.37 | | | 27.22 |
| 5 | −88.560 | 1.36 | 1.59282 | 68.6 | 26.95 |
| 6 | 31.212 | 0.15 | | | 25.77 |
| 7 | 22.742 | 7.41 | 1.80518 | 25.4 | 26.02 |
| 8 | −99.973 | 5.82 | | | 24.74 |
| 9* | −31.998 | 1.20 | 1.85135 | 40.1 | 17.86 |
| 10 | −900.000 | (VARIABLE) | | | 17.10 |
| 11 | ∞ | 1.46 | | | 10.01 |
| 12 | 45.129 | 1.59 | 1.88300 | 40.8 | 10.60 |
| 13 | −92.908 | 1.85 | | | 10.67 |
| 14(STOP) | ∞ | 1.70 | | | 10.70 |
| 15 | −18.989 | 0.75 | 1.88300 | 40.8 | 10.71 |
| 16 | 31.482 | 3.60 | 1.51823 | 58.9 | 11.28 |
| 17 | −19.695 | 0.20 | | | 12.23 |
| 18 | 205.131 | 4.29 | 1.48749 | 70.2 | 12.66 |
| 19 | −12.187 | 0.80 | 1.88300 | 40.8 | 13.14 |
| 20 | −26.863 | 0.20 | | | 13.91 |
| 21 | 490.055 | 3.30 | 1.59270 | 35.3 | 15.26 |
| 22 | −21.668 | 0.35 | | | 16.32 |
| 23 | ∞ | 0.93 | 1.83400 | 37.2 | 17.38 |
| 24 | 28.200 | 4.77 | 1.49700 | 81.5 | 18.09 |
| 25 | −31.469 | (VARIABLE) | | | 19.05 |
| 26 | ∞ | 1.49 | 1.48749 | 70.2 | 21.86 |
| 27 | −111.396 | (VARIABLE) | | | 22.16 |
| IMAGE PLANE | ∞ | | | | |

ASPHERIC DATA
NINTH SURFACE

K = 0.00000e+00  A4 = −4.97134e−006
A6 = −6.72678e−009  A8 = −4.90505e−010
A10 = 9.41652e−012  A12 = −5.79006e−014

VARIOUS DATA

| | SHORT FOCUS | INTERMEDIATE | LONG FOCUS |
|---|---|---|---|
| FOCAL LENGTH | 8.05 | 11.84 | 15.07 |
| F NUMBER | 4.12 | 4.12 | 4.12 |
| IMAGE ANGLE | 175 | 175 | 175 |
| IMAGE HEIGHT | 11.15 | 16.77 | 21.64 |
| LENS OVERALL LENGTH | 129.07 | 127.15 | 130.22 |
| BF | 40.25 | 47.75 | 54.25 |
| d10 | 20.21 | 8.60 | 3.30 |
| d25 | 0.19 | 2.37 | 4.25 |
| d27 | 40.25 | 47.75 | 54.25 |

ZOOM LENS UNIT DATA

| UNIT | STARTING SURFACE | FOCAL LENGTH | LENS LENGTH | FRONT FOCAL POINT POSITION | BACK FOCAL POINT POSITION |
|---|---|---|---|---|---|
| 1 | 1 | −11.13 | 41.14 | 10.33 | −15.81 |
| 2 | 11 | 29.36 | 25.79 | 15.67 | −5.08 |
| 3 | 26 | 228.51 | 1.49 | 1.00 | 0.00 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. While the above embodiments discuss the fisheye zoom lens, an optical apparatus having the fisheye zoom lens configured to form an object image on an image plane constitutes one aspect of the present invention.

Table 4 summarizes values of each conditional expression:

TABLE 4

| | (1) | (2) | (3) | (4) | (5) | (6) | (7) | (8) |
|---|---|---|---|---|---|---|---|---|
| First Embodiment | 1.94 | 3.69 | 0.55 | 1.804 | 0.019 | 0.028 | 0.650 | 0.407 |
| Second Embodiment | 1.80 | 4.27 | 0.55 | 1.804 | 0.028 | 0.028 | 0.685 | 0.392 |
| Third Embodiment | 1.94 | 3.62 | 0.55 | 1.804 | 0.019 | 0.028 | 0.615 | 0.379 |

Figure 9:
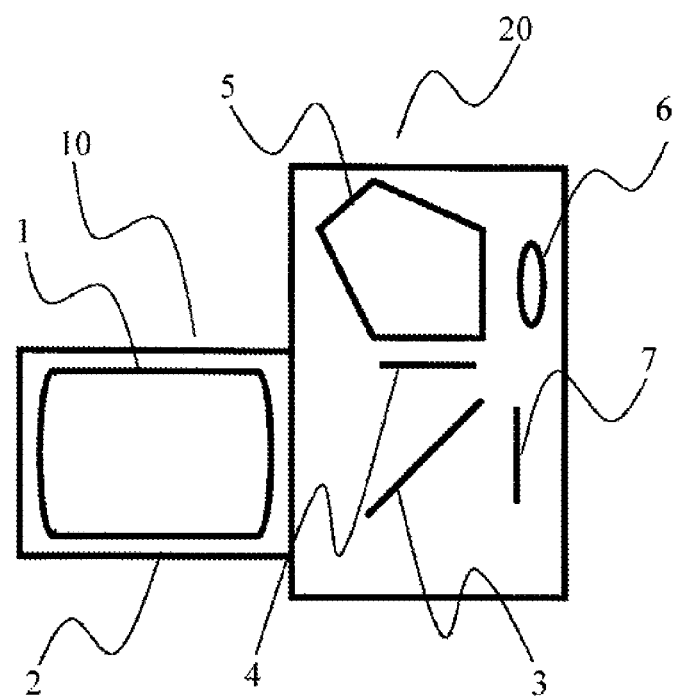
FIG. 9 is a schematic structural diagram of an image pickup apparatus (optical apparatus) that utilizes an optical system of the present invention for an image pickup optical system.

Referring now to FIG. 9, a description will be given of an embodiment of a single-lens reflex camera (optical apparatus) using the optical system of this embodiment for an image pickup optical system. In FIG. 9, reference numeral 10 denotes an image pickup lens having an optical system 1 according to one of the first, second, and third embodiments. The image pickup lens 10 is held on a barrel 2 that serves as a holder. Reference numeral 20 denotes a camera body, which includes a quick return mirror 3 that reflects light from the image pickup lens 10 toward the upper direction, a focus plate 4 arranged on an imaging position of the image pickup lens 10, a penta roof prism 5 configured to convert a reverse image formed by the focus plate 4 into an erect image, an eyepiece 6 configured to magnify and form the erect image, etc. Reference numeral 7 denotes a photosensitive surface, on which a solid-state image sensor (photoelectric conversion element), such as a CCD sensor and a CMOS sensor as a light receiving unit (recording unit) and a film is arranged. At the image pickup time, the quick return mirror 3 retreats from the optical path, and an image is formed on the photosensitive surface 7 by the image pickup lens 10.

At least one of the above embodiments can provide a fisheye zoom lens that provides a circular fisheye to a diagonal fisheye.

The fisheye zoom lens of each embodiment is applicable to an image pickup apparatus.

This application claims the benefit of Japanese Patent Application No. 2010-159314, filed Jul. 14, 2010, which is hereby incorporated by reference herein in its entirety.

What is claimed is:

1. An optical system comprising, in order from an object side, a first lens unit having a negative refractive power and a second lens unit having a positive refractive power, the first lens unit and the second lens unit being configured to move along an optical axis when a magnification is varied from a shortest focal length to a longest focal length, a largest image height of the shortest focal length being different from that of the longest focal length,
wherein the optical system satisfies the following conditional expressions:

$1.70 \leq Yt/Yw \leq 2.5$ $Y = 2 \times f \times \sin(\theta/2) (85° \leq \theta \leq 90°)$ $3.45 \leq bfw/|f1| \leq 7,$ where fw is the shortest focal length, ft is the longest focal length, f is an arbitrary focal length that satisfies fw≦f≦ft, θ is an angle between the optical axis and a principal ray of an off-axis light flux incident upon a lens surface closest to the object, Y is a formed image height of a ray incident at the angle θ, Yw is the largest image height at the shortest focal length, Yt is the largest image height at the longest focal length, f1 is a focal length of the first lens unit, and bfw is a back focus at the shortest focal length.

2. The optical system according to claim 1, wherein the optical system satisfies the following conditional expression:

$$0.4 \leq SF1 \leq 1.0$$

$$SF1=(r1-r2)/(r1+r2),$$

where r1 is a radius of curvature on the object side of a negative meniscus lens of the first lens unit which is closest to the object, r2 is a radius of curvature of the negative meniscus lens on the image side, and SF1 is a form factor.

3. The optical system according to claim 1, wherein the optical system satisfies the following conditional expression:

$$1.75 \leq nG1 \leq 2.00$$

where nG1 is a refractive index of a negative meniscus lens of the first lens unit which is closest to the object.

4. The optical system according to claim 1, wherein the first lens unit includes, on an image side of a negative meniscus lens closest to the object, a negative lens that satisfies the following conditional expression:

$$\theta gF-(-0.001682 \cdot vd+0.6438) \geq 0.01$$

where θgF is a partial dispersion ratio and vd is an Abbe number of the negative lens.

5. The optical system according to claim 1, wherein the second lens unit includes a positive lens that satisfies the following conditional expression:

$$\theta gF-(-0.001682 \cdot vd+0.6438) \geq 0.01$$

where θgF is a partial dispersion ratio and vd is an Abbe number of the positive lens.

6. The optical system according to claim 1, wherein the second lens unit satisfies the following expression and is configured to move in the optical axis toward the object when the magnification is varied from the shortest focal length to the longest focal length:

$$0.55 \leq m2/f2 \leq 0.8$$

where m2 is a moving amount of the second lens unit and f2 is a focal length of the second lens unit.

7. The optical system according to claim 1, wherein the optical system satisfies the following conditional expression where f2 is a focal length of the second lens unit:

$$0.2 \leq |f1|/f2 \leq 0.42.$$

8. The optical system according to claim 1, wherein a part of the first lens unit is configured to move in the optical axis direction during focusing.

9. An optical apparatus configured to form an object image on an image surface, and comprising an optical system comprising, in order from an object side, a first lens unit having a negative refractive power and a second lens unit having a positive refractive power, the first lens unit and the second lens unit being configured to move along an optical axis when a magnification is varied from a shortest focal length to a longest focal length, a largest image height of the shortest focal length being different from that of the longest focal length, wherein the optical system satisfies the following conditional expressions:

$$1.70 \leq Yt/Yw \leq 2.5$$

$$Y=2 \times f \times \sin(\theta/2) \ (85° \leq \theta \leq 90°)$$

$$3.45 \leq bfw/|f1| \leq 7,$$

where fw is the shortest focal length, ft is the longest focal length, f is an arbitrary focal length that satisfies fw≦f≦ft, θ is an angle between the optical axis and a principal ray of an off-axis light flux incident upon a lens surface closest to the object, Y is a formed image height of a ray incident at the angle θ, Yw is the largest image height at the shortest focal length, Yt is the largest image height at the longest focal length, f1 is a focal length of the first lens unit, and bfw is a back focus at the shortest focal length.

* * * * *